United States Patent [19]

Patterson et al.

[11] Patent Number: 4,802,057
[45] Date of Patent: Jan. 31, 1989

[54] RODENT CONTROL DEVICE

[76] Inventors: Charles R. Patterson; Gary E. Lutz, both of 137 Lynn St., Ames, Iowa 50010

[21] Appl. No.: 142,438

[22] Filed: Jan. 11, 1988

[51] Int. Cl.[4] .......................................... H04B 11/00
[52] U.S. Cl. .................................. 361/232; 116/22 A
[58] Field of Search .................... 367/139; 340/384 E; 43/124; 116/22 A; 361/232

[56] References Cited

U.S. PATENT DOCUMENTS

| 4,215,429 | 7/1980 | Riach | 367/139 |
| 4,338,593 | 7/1982 | Mills | 340/384 E |
| 4,414,653 | 11/1983 | Pettinger | 367/139 |

Primary Examiner—Thomas H. Tarcza
Assistant Examiner—Ian J. Lobo
Attorney, Agent, or Firm—G. Brian Pingel; Kent A. Herink

[57] ABSTRACT

An improved rodent control device for generating a pulsating and interrupted magnetic field offensive to rodents in buildings includes a housing, an electrical circuit for generating the pulsating magnetic field and an electrical supply member for electrically connecting the electrical circuit with an AC power source. The electrical circuit includes a low voltage circuit for generating a pulsed and interrupted frequency gating signal, a signal amplifying device, and a high voltage circuit that produces a pulsed and interrupted high voltage output signal in response to the gating signal of the low voltage circuit and includes a magnetic field generator for receiving the output signal from the high voltage circuit and generating a pulsating and interrupted magnetic field in response to the output signal.

4 Claims, 1 Drawing Sheet

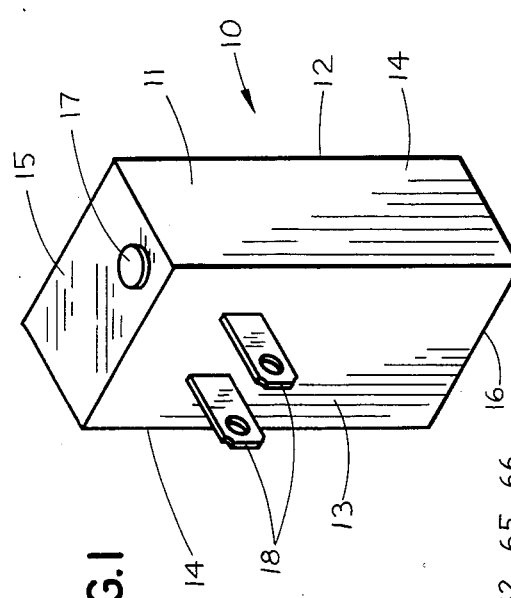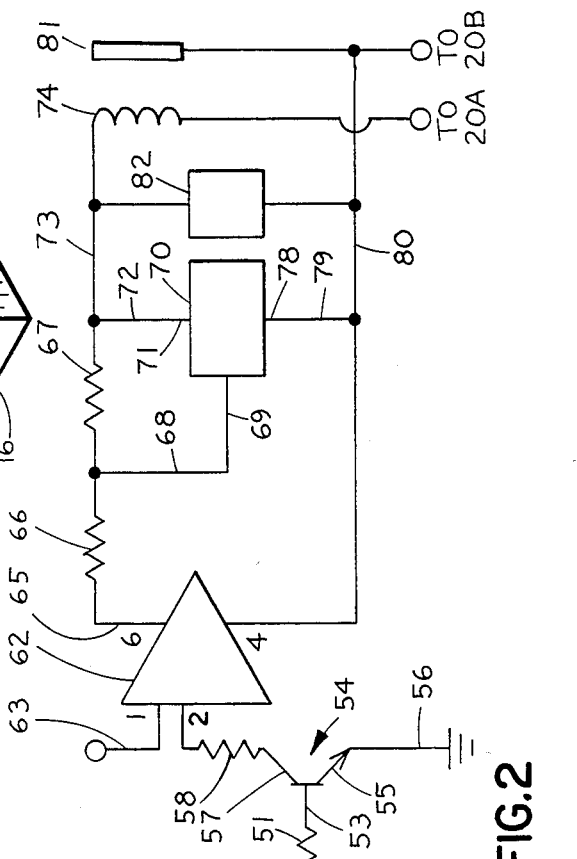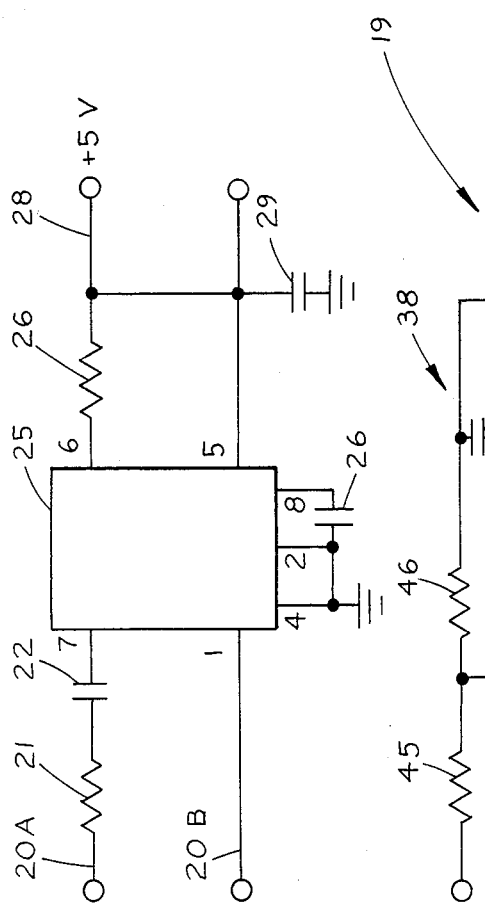

RODENT CONTROL DEVICE

BACKGROUND OF THE INVENTION

1. Field of the Invention

The present invention relates in general to devices for controlling the population of rodents in buildings and more specifically relates to an improved rodent control device that produces a pulsating and interrupted frequency resulting in an offensive magnetic field generation that acts as an irritant to rodents.

2. Description of the Prior Art

A wide variety of rodent control devices are known in the art. Many such devices operate on the basis of producing a low frequency of approximately 60 cycles per minute which is known in the art to be offensive to rodents such as rats and mice. For purposes of efficiency and long life operation, it has been found that the frequency generated does not have to be continuous, but instead, these devices operate effectively in spite of an interruption of the frequency at predetermined intervals. To provide the required frequency and the predetermined interruptions, the majority of prior art devices have employed a wide array of mechanical switching type devices requiring relatively frequent maintenance or replacement.

One improvement to the above devices is a unit that utilizes electronic switching components as disclosed in U.S. Pat. No. 4,414,653 issued Nov. 8, 1983. As described in the "653" Patent, the disclosed unit is designed to be utilized with a three wire electrical wiring system whereby the electrical wiring ground line serves as the path of conductive flow for the frequency generated by the unit.

A second improvement to the above devices is disclosed in U.S. patent application Ser. No. 06/787,490 which provides a control device adapted to be employed with common two wire electrical wiring systems found in most buildings and utilizes circuitry including an isolating means to electrically separate low and high voltage portions of the circuit to provide a more efficient and safety oriented type of circuitry.

The present invention is an improvement over the invention disclosed in the "490" Application. It is adapted to provide a simplified and more efficient circuit than that disclosed in such application.

SUMMARY OF THE INVENTION

The present invention provides a rodent control device for generating a pulsed and interrupted magnetic field offensive to rodents in buildings. The device includes a housing, electrical supply means having hot and neutral lines, electronic circuitry for producing a pulsating and interrupted magnetic field that is supplied to a conductive means associated with said neutral line to conduct such magnetic field about the building in which the rodent population is desired to be controlled.

The electronic circuitry of the invention includes a low voltage circuit means for generating a pulsed and interrupted frequency gating signal, a current amplifying means for amplifying the gating signal, high voltage circuit means to provide a pulsed and interrupted high voltage output signal in response to the gating signal of the low voltage circuit means, circuit isolating means physically connected to the amplifying means and the high voltage circuit means and actuated by the amplified low voltage gating signal to provide a corresponding gating signal to the high voltage circuit means, and a magnetic field generating means that receives the output signal from the high voltage circuit means and generates a pulsed and interrupted magnetic field in response to such output signal.

The high voltage circuit means includes a gating means that is actuated in response to actuation of the circuit isolating means and is connected with a voltage and current limiting means that protects the gating means from electrical spikes produced by said magnetic field generating means.

The invention is adapted to provide a simplified and more effective and efficient rodent control device that is useable in connection with any type of 115 volt AC outlet and yet is of a sufficiently small size that it takes up little room and attracts little attention.

The invention will appear more clearly from the following detailed description when taken in conjunction with the accompanying drawings, showing by way of example, a preferred embodiment of the inventive idea wherein like numerals refer to like parts throughout.

BRIEF DESCRIPTION OF THE DRAWINGS

FIG. 1 is a reduced perspective view of a rodent control device of the present invention showing a housing and an electrical supply member associated with the housing for supplying electrical power to the interior components thereof; and FIG. 2 is a circuit diagram of the electronic circuitry of the device of FIG. 1.

DESCRIPTION OF THE PREFERRED EMBODIMENT

Referring now to the drawings, a preferred embodiment of an improved rodent control device of the present invention is shown generally at 10 in FIG. 1. The control device 10 is adapted to be used in residential and commercial buildings to provide a safe, efficient and effective means for controlling the rodent population therein. The device 10 operates not on the basis of killing rodents, but rather creates a pulsed and interrupted magnetic field offensive to them. The device 10, therefore, drives away any existing rodents in the buildings and thereafter provides an operative rodent shield for them by supplying the offensive pulsed and interrupted magnetic field generated throughout the buildings.

As shown in FIG. 1, the device 10 includes a generally rectangular housing 11 that is preferrably formed from a high strength plastic but may as well be formed from wood or metal, as desired. In comparison to prior arts devices, the present invention is relatively small as the housing 10 is 2 7/16 inches wide by 4 7/16 inches long by 1 1/16 inches deep.

Housing 11 includes a front wall 12, rear wall 13, side walls 14 and top and bottom walls 15 and 16 respectively. The top wall 15 includes an opening for a light emitting diode 17, and protruding through the rear wall 13 are standard type power supply prongs 18 as customarily used for connection to a normal two prong electrical outlet found in homes and offices for supplying electrical power to electronic circuitry located within the housing 11.

Referring now to FIG. 2, a schematic diagram of a solid state electronic circuit for the device 10 is shown generally at 19. The circuit 19 includes hot and neutral lines 20a and 20b which receive approximately 115 volts AC electrical power via the power supply prongs 17 when plugged into the normal electrical distribution system of a building. Although the lines 20a and 20b are denoted as hot and neutral lines, such denotation is solely for purposes of illustration due to the fact that the electrical power provided to such lines is an alternating current and the lines 20a and 20b will alternate between being hot and neutral.

Connected in series fashion in the line 20a is a resistor 21 and a capacitor 22 which serve as current and voltage limiting devices. Connected across the lines 20a and 20b at its terminals 7 and 1 is an integrated circuit voltage regulator 25 that rectifies the supply voltage and provides approximately a regulated output voltage of 5 volts DC across output terminals 5 and 6. The regulator 25 is an I.C. Max 610 regulator, and also has a terminal 8 connected through a capacitor 26 to ground. Terminals 4 and 2 of the regulator are also connected to ground. A current limiting resistor 27 is connected to the output terminal 6 of the regulator 25 to an output lead 28. The output lead 28 is also connected to the terminal 5 of the regulator 25 and is connected to ground through a capacitor 29.

The five volt DC regulated voltage at the lead 28 is applied across leads 30 and 31 of a duel timing network shown generally at 32. The duel timing network 32 includes an intersil ICM 7556 integrated circuit 33. This type of duel timing network is well known in the art and is described in U.S. Pat. No. 4,414,653 issued Nov. 8, 1983. The integrated circuit 33 includes two different timing circuits to provide an output signal on lead 34 that is pulsed at a desired frequency of approximately one pulse per second and is interrupted at predetermined intervals. Accordingly, an approximately 60 pulse per minute output is present on the lead 34 and exists for a first predetermined period of time and is then interrupted for a second predetermined period of time. Interruption of the output on the lead 34 is not essential to the rodent control operation of the device 10, but for purposes of economy and lifetime of operation of the circuit 19, such interruption is highly preferable.

The timing circuits of the integrated circuit 33 include and are controlled by voltage dividing circuits 37 and 38. The voltage dividing circuit 37 includes resistors 39 and 40 and a capacitor 41 which are chosen appropriately to provide the desired voltage across input terminals 1, 2, and 6 of the integrated circuit 33 to establish a first desired timing sequence for the network 32 to control the frequency of the pulse rate appearing on the output lead 34 (preferably, this pulse rate is approximately one pulse per second with the component values listed in Table I below).

The voltage dividing circuit 38 is formed of resistors 45 and 46 connected to terminal 13 of circuit 33, and a capacitor 47 connected to terminals 8 and 12 of circuit 33, which control the time period during which the pulses on the output line 34 are interrupted (preferably pulses will be conducted on the line 34 for approximately 3 and one half to 4 minutes and then will be absent for a period of 1 and one half to 2 minutes with the component values listed in Table I below). Terminals 3 and 11 of the integrated circuit 33 are connected to ground via capacitors 48 and 49, respectively, and terminal 9 is connected directly to ground.

The output line 34 is connected to resistors 50 and 51, with the resistor 50 together with the light emitting diode 17 forming a circuit branch 52 that is connected to the regulated 5 volt supply voltage lead 28. The resistor 51 is connected to the base 53 of a current amplifying transistor 54. The transistor 54 has an emitter 55 connected by a line 56 to ground, and a collector 57 connected to a resistor 58.

The purpose of the current amplifying transistor 54 is to insure that the low voltage signal from the integrated circuit 33 is sufficiently strong to actuate an opto-coupler 62 (a Motorola MOC3030) through the signal provided by the transistor 54 (an MPS-A13) to terminal 2 of the opto-coupler 62 via the resistor 58. If the signal on line 34 is not of sufficient strength, the opto-coupler will not be actuated as desired and inefficient or ineffective operation will result. Thus, the signal from the integrated circuit 33 actuates the transistor 54 and the amplified signal from the transistor 54 in turn actuates the opto-coupler 62. Also, when the transistor 54 is actuated, current flows through the circuit branch 52 to actuate the light emitting diode 17 to indicate the device 10 is in operation.

The 5 volt regulated supply voltage is supplied to terminal 1 of the opto-coupler 62 by a line 63. The opto-coupler 62 is a well known device in the art and is used for providing electrical isolation of the low voltage integrated circuit 33, the timing networks 37 and 38 and the transistor 54 from the remaining high voltage circuit means portion of the circuit 19.

When the opto-coupler 62 receives a pulsed and interrupted input at its terminal 2 from transistor 54, it is actuated to optically provide an output on a line 65 that is connected to the coupler's terminal 6. The output on the line 65 is fed to a voltage dividing network formed of resistors 66 and 67 to apply a gating signal via a line 68 to a gate 69 of a triac 70, which is a General Electric SC104V.

An input terminal 71 of the triac 70 is connected through lines 72, 73 and a coil 74 to the electrical hot-line 20a. An output terminal 78 of the triac 70 is connected by lines 79 and 80 to the electrical supply neutral line 20b. Also, the line 80 is connected to terminal 4 of the opto-coupler 62. Consequently, when the opto-coupler 62 is actuated, a complete circuit is provided for the operation of the triac 70 and current will flow through the coil 74 in correspondence to the pulsed and interrupted signal received by the opto-coupler 62. As a result, the coil 74 will provide a pulsing and interrupted magnetic field that is offensive to rodents.

A core 81 of the coil 74 is connected to the neutral line 20b so that the pulsing and interrupted magnetic field will be induced onto the line 20b. Thus, electrical current flows in the line 20b and from there to the entire electrical wiring of the building in which the device 10 is located via the neutral line 20b to produce pulsing and interrupted lines of magnetic flux.

To provide protection for the triac 70 from high voltage transcient voltage spikes due to the pulsing of the magnetic field produced by the coil 74, an RC network 82 is connected across lines 73 and 80. The network 82 has a resistor (100 Ohm) and capacitor (0.1 Microfared) connected in series and is a Rifa PMR 205AB.

Thus, the device 10 provides a safe, efficient and effective economical means for controlling the population of rodents in buildings and is relatively small in size and can easily be enabled simply by plugging into a standard electrical outlet. It will be obvious to those skilled in the art that various modifications can be made as to the details described above. For example, a wide variety of voltage rectifying and regulating circuits can be employed for providing a low supply voltage as well as numerous pulsing circuits for providing a gating signal. Hence, the invention is not to be considered as limited to the particular details given, but should be considered as extending to emcompass all such revisions and modifications as would be obvious to a workman of ordinary skill in the art.

Component values and identification for a preferred embodiment of the rodent control device 10 as described above are as follows:

TABLE 1

| | Component No. | Value |
|---|---|---|
| Resistors | 21 | 1 Watt - 100 Ohms |
| | 26 | ¼ Watt - 20 Ohms |
| | 39 | ¼ Watt - 1.0 Mohms |
| | 40 | ¼ Watt - 1.5 Mohms |
| | 45 & 46 | ¼ Watt - 470 Kohms |
| | 50 | ¼ Watt - 510 Ohms |
| | 51 | ¼ Watt - 51 Kohms |
| | 58 | ¼ Watt - 220 Ohms |
| | 66 | ¼ Watt - 1 Kohms |
| | 67 | ¼ Watt - 2.2 Kohms |
| Capacitors | 22 | 250 Volt - 47 Microfared |
| | 26, 29 & 41 | 25 Volt - 100 Microfared |
| | 48 & 49 | 25 Volt - .01 Microfared |
| | 47 | 50 Volt - 1 Microfared |

I claim:

1. A rodent control device for generating a pulsating magnetic field offensive to rodents in buildings, said device comprising:
   (a) a housing;
   (b) an electrical supply means having hot and neutral lines for connection to a source of high voltage AC electrical power and associated with said housing to supply said power to the interior thereof;
   (c) low voltage circuit means for generating a pulsed frequency gating signal;
   (d) rectifying and voltage regulating circuit means connected in series to said hot and neutral lines for reducing and rectifying said high voltage AC power to a regulated low voltage DC electrical power that serves as a supply voltage to said low voltage circuit means;
   (e) high voltage circuit means connected to said hot and neutral lines for providing a pulsed high voltage output signal in response to the gating signal of said low voltage circuit means;
   (f) amplifying means for amplifying the frequency gating signal from said low voltage circuit means;
   (g) circuit isolating means that is physically connected to said amplifying means and said high voltage circuit means and is actuated by the amplified gating signal from said amplifying means to provide a corresponding pulsed gating signal to said high voltage circuit means, said isolating means serving to electrically isolate said low voltage circuit from said high voltage circuit;
   (h) said high voltage circuit means includes a magnetic field generating means that is connected to the hot line of said electrical supply means and receives said pulsed gating signal and generates a pulsating magnetic field in response thereto;
   (i) conductive means connected to the neutral line of said electrical supply means and associated with said magnetic field generating means in such fashion that an electrical current is established in said conductive means in response to said pulsating magnetic field, which current produces lines of pulsating magnetic flux about said conductive means and said neutral line of said electrical supply means.

2. A rodent control device as recited in claim 1 wherein said high voltage circuit means includes a gating means that is actuated in response to actuation of the circuit isolating means and is connected with a voltage and current limiting means that protects the gating means from electrical spikes produced by said magnetic field generating means.

3. A rodent control device as recited in claim 1 wherein said magnetic field generating means is connected to the input of said gating means and produces said pulsating magnetic field upon actuation of said gating means.

4. A rodent control device as recited in claim 3 wherein a light emitting diode is connected to said amplifying means and is actuated upon the actuation of said amplifying means to indicate the device is in an operational mode.

* * * * *